United States Patent
Yano et al.

(10) Patent No.: US 12,154,294 B2
(45) Date of Patent: Nov. 26, 2024

(54) MODEL CREATION DEVICE AND MODEL CREATION METHOD

(71) Applicant: Hitachi, Ltd., Tokyo (JP)

(72) Inventors: Taiki Yano, Tokyo (JP); Nobutaka Kimura, Tokyo (JP); Ryo Sakai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 17/642,615

(22) PCT Filed: Nov. 17, 2020

(86) PCT No.: PCT/JP2020/042830
§ 371 (c)(1),
(2) Date: Mar. 11, 2022

(87) PCT Pub. No.: WO2021/106686
PCT Pub. Date: Jun. 3, 2021

(65) Prior Publication Data
US 2022/0343538 A1    Oct. 27, 2022

(30) Foreign Application Priority Data

Nov. 28, 2019  (JP) .................. 2019-215673

(51) Int. Cl.
*G06T 7/73* (2017.01)
*G06T 17/20* (2006.01)
*G06T 19/20* (2011.01)

(52) U.S. Cl.
CPC .............. *G06T 7/75* (2017.01); *G06T 17/20* (2013.01); *G06T 19/20* (2013.01)

(58) Field of Classification Search
CPC ........... G06T 7/75; G06T 17/20; G06T 19/20; G06T 2207/20081; G06T 2207/20084; G06T 7/73; G06T 2219/2021
See application file for complete search history.

(56) References Cited

U.S. PATENT DOCUMENTS 5,706,419 A      1/1998  Matsuga et al.
5,819,016 A  *  10/1998  Watanabe ............ G01B 11/002
                                                     345/419

(Continued)

FOREIGN PATENT DOCUMENTS

| JP | 8-14860 A | 1/1996 |
|---|---|---|
| JP | 8-233556 A | 9/1996 |
| JP | 2009-93611 A | 4/2009 |

OTHER PUBLICATIONS

International Search Report (PCT/ISA/210) issued in PCT Application No. PCT/JP2020/042830 dated Jan. 19, 2021 with English translation (five (5) pages).

(Continued)

*Primary Examiner* — Matthew C Bella
*Assistant Examiner* — Janice E. Vaz
(74) *Attorney, Agent, or Firm* — Crowell & Moring LLP

(57) ABSTRACT

A model creation apparatus being configured to: hold at least one image of the registration target object in one or more postures and a reference model indicating a shape of a reference object; acquire information indicating a feature of the registration target object in a first posture; and correct, when a shape in the first posture that is indicated by the reference model is determined to be dissimilar based on a predetermined first condition, the reference model based on the information indicating the feature to thereby create the model indicating the shape of the registration target object.

13 Claims, 11 Drawing Sheets

(56) References Cited

U.S. PATENT DOCUMENTS 8,379,014 B2     2/2013   Wiedemann et al.
2017/0132451 A1*   5/2017   Namiki ................ G06V 10/757

OTHER PUBLICATIONS

Japanese-language Written Opinion (PCT/ISA/237) issued in PCT Application No. PCT/JP2020/042830 dated Jan. 19, 2021 (three (3) pages).
Japanese-language Office Action issued in Japanese Application No. 2019-215673 dated Jun. 27, 2023 with English translation (8 pages).

\* cited by examiner

MODEL CREATION DEVICE AND MODEL CREATION METHOD

CLAIM OF PRIORITY

The present application claims priority from JP application 2019-215673 filed on Nov. 28, 2019, the content of which is hereby incorporated by reference into this application.

BACKGROUND OF THE INVENTION

The present invention relates to a model creation apparatus and a model creation method.

JP H08-233556 A is one of technologies that are the background art of this technical field. In JP H08-233556 A, there is described a picked-up image processing apparatus including: "image pickup means 1; first image storage means 3 in which a photographic object image picked up by the image pickup means 1 is stored as an image of a photographic object viewed from a predetermined viewpoint position; three-dimensional shape model storage means 2 for generating, based on a standard three-dimensional shape model, a target image viewed from a viewpoint position closest to the viewpoint position of the picked-up photographic object image; second image storage means 4 for storing the generated target image; difference extraction means 5 for extracting a difference between the photographic object image and the target image stored in their respective image storage means; and shape model modification means for modifying the standard three-dimensional shape model based on the extracted difference. The apparatus reconstructs a shape model of the photographic object by modifying the standard three-dimensional shape model that is a representative shape model of the photographic object, based on the difference between the photographic object image and the target image." (See Abstract.)

The technology as described in JP H08-233556 A has difficulties in estimating how much effect a local area has on recognition of a 3D model to be newly created, and it is accordingly difficult to evaluate how accurately the local area is to be reflected on the 3D model. In other words, with the technology as described in JP H08-233556 A, recognition performance of the new 3D model may be insufficient due to the evaluation of the local area described above being insufficient. In addition, the technology as described in JP H08-233556 A may require a large volume of data and processing in creation of a new 3D model because fluctuations (noise) of a local area that hardly affect recognition of a 3D model of a target image are undesirably reflected on the new 3D model as well.

The technology as described in JP H08-233556 A requires a large volume of data and processing also to determine how accurately a local area is to be reflected on a 3D model. It is therefore an object of at least one aspect of this invention to create a model of a registration target object on which local information of the registration target object that affects recognition performance is reflected, with a small volume of data and processing.

In order to solve the above problem, an aspect of the present invention adopts the following structure. A model creation apparatus for creating a model that indicates a shape of a registration target object, the model creation apparatus comprises: a processor; and a memory, the memory being configured to hold: at least one image of the registration target object in one or more postures; and a reference model indicating a shape of a reference object, the processor is configured to: acquire information indicating a feature of the registration target object in a first posture; and correct, when a shape in the first posture that is indicated by the reference model is determined to be dissimilar based on a predetermined first condition, the reference model based on the information indicating the feature to thereby create the model indicating the shape of the registration target object.

An aspect of the present invention can create a model of a registration target object on which local information of the registration target object that affects recognition performance is reflected, with a small volume of data and processing.

Objects, configurations, and effects other than those described above become apparent in the following description of embodiments of this invention.

BRIEF DESCRIPTIONS OF DRAWINGS

The present invention can be appreciated by the description which follows in conjunction with the following figures, wherein.

DETAILED DESCRIPTION OF THE PREFERRED EMBODIMENTS

Figure 1:
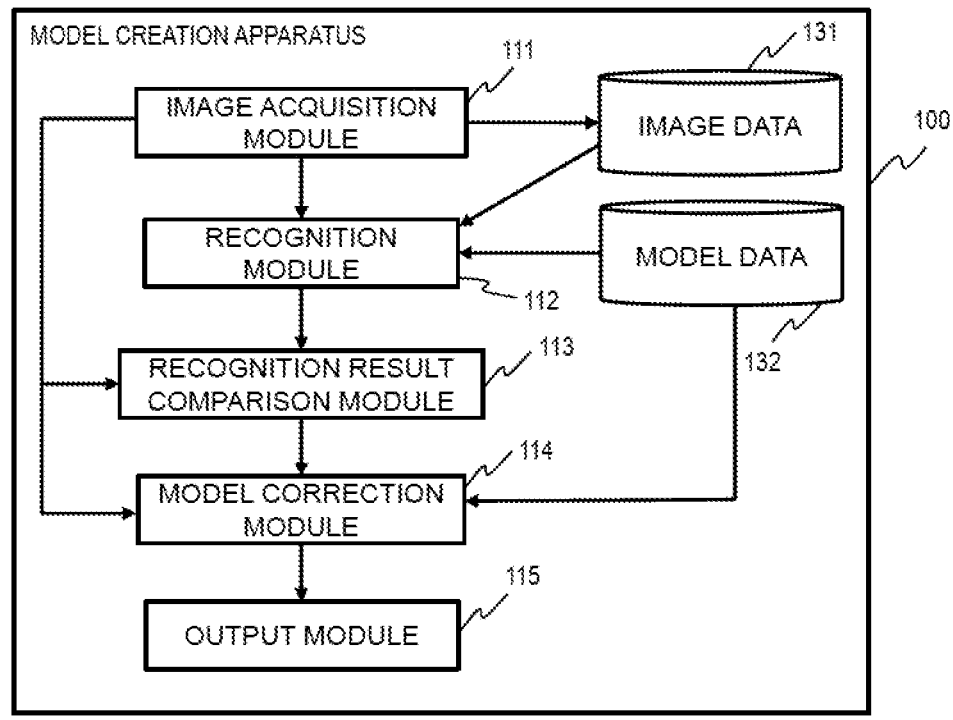
FIG. 1 is a block diagram for illustrating a function configuration example of a model creation apparatus according to the first embodiment.

Hereinafter, embodiments of the invention are described in detail with reference to the accompanying drawings. In drawings, same components are denoted by same reference numerals in principle, and a repetitive description thereof is omitted. It should be noted that the present embodiments are merely examples for implementing the present inventions, and do not limit the technical scope of the present inventions.

First Embodiment

FIG. 1 is a block diagram for illustrating a function configuration example of a model creation apparatus. A model creation apparatus 100 uses a model indicating a shape of a registered reference object to create a model indicating a shape of a registration target object to be newly registered. A three-dimensional (3D) model capable of indicating a shape of an object with the use of vertices and meshes (planes) is an example of this model. In a first embodiment of this invention, an example of expressing the shape of an object mainly with the use of a 3D model is described. However, other models including a 2D model may be used. A model may indicate not only the shape of an object but also a pattern, a viewpoint, and the like.

The model creation apparatus 100 includes, for example, an image acquisition module 111, a recognition module 112, a recognition result comparison module 113, a model correction module 114, and an output module 115. The image acquisition module 111 acquires an image of a registration target object. The recognition module 112 inputs an image of an object to a feature extractor, which is described later, to thereby output a posture of the object.

The recognition result comparison module 113 determines whether a posture acquired by inputting the image of the registration target object to the feature extractor is a correct posture. The model correction module 114 creates a 3D model of the registration target object by correcting a 3D model of a reference object. The output module 115 outputs, among others, information about an image of the reference object and about the image of the registration target object, information about the postures output by the feature extractor, and information about the created 3D model.

The model creation apparatus 100 holds image data 131 and model data 132. The image data 131 is data in which at least one image of one or more reference objects in one or more postures, and at least one image of a new registration object in one or more postures acquired by the image acquisition module 111, are associated with the one or more postures. The at least one image of one or more reference objects in one or more postures are included in the image data 131 in advance.

The model data 132 includes 3D models indicating shapes of reference objects and a 3D model indicating a shape of a registration object which is created by the model creation apparatus 100. The 3D models indicating the shapes of the reference objects are included in the model data 132 in advance before model creation processing is executed. In the model data 132, the objects corresponding to the 3D models and categories to which the objects belong are defined.

The model data 132 also includes, for each of the reference objects, one feature extractor associated with the reference object. When an image of an object is input to the feature extractor, the feature extractor extracts a feature of the image, estimates a posture of the object in the image based on the extracted feature, and outputs the estimated feature. The feature extractor can output the extracted feature as well. Each feature extractor associated with one of the reference objects is created by learning images of the one of the reference objects. The model data 132 may include, in addition to the feature extractors each associated with one of the reference objects, a feature extractor shared by all reference objects as a feature extractor adaptable to any of the reference objects, and this feature extractor may be used in place of the feature extractors each associated with one of the reference objects.

The feature extractor shared by all reference objects as a feature extractor adaptable to any of the reference objects may also be capable of extracting, when at least one image of an object in one or more postures is input, features of the at least one image, and outputting a result indicating to which reference object the object of the at least one image corresponds (the feature extractor may further be capable of outputting a result indicating that the object of the at least one image corresponds to none of the reference objects).

Examples of a method of recognizing a posture by a feature extractor associated with one reference object include a method in which at least one image of a registration target object in one or more postures, and at least one image of the reference object in one or more postures, are input to an auto-encoder, a resultant feature of each posture of the registration target object and a resultant feature of each posture of the reference object are compared to each other, and a posture in which the features are closest to each other is returned as a recognition result. Feature extractors to be included in the model data 132 are not limited to ones utilizing this posture recognition method, and the model data 132 may include any feature extractor that is created from learning data acquired through learning of images of a reference object and that can output a posture in response to input of an image.

In the example described above, each feature extractor extracts a feature of an image input thereto, and estimates a posture based on the extracted feature. However, each feature extractor may be separated into a feature extractor that executes only extraction of a feature of an image input thereto and a posture estimator to which the feature is input from the feature extractor and which estimates a posture.

Figure 2:
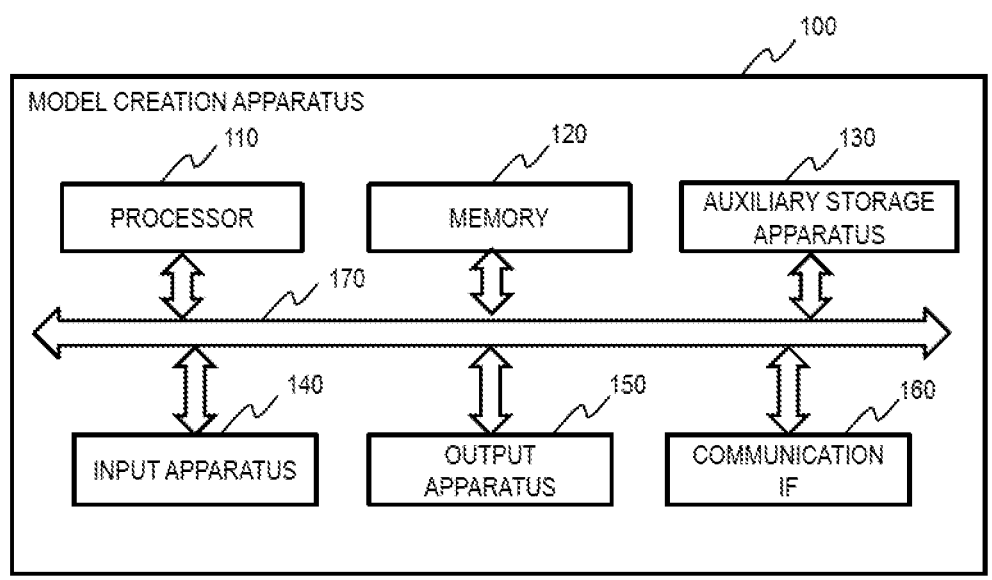
FIG. 2 is a block diagram for illustrating a hardware configuration example of the model creation apparatus according to the first embodiment.

FIG. 2 is a block diagram for illustrating a hardware configuration example of the model creation apparatus 100. The model creation apparatus 100 is configured from a computer including, for example, a processor 110, a memory 120, an auxiliary storage apparatus 130, an input apparatus 140, an output apparatus 150, and a communication interface (IF) 160, which are coupled to one another by an internal communication line 170 such as a bus.

The processor 110 executes a program stored in the memory 120. The memory 120 includes a read only memory (ROM), which is a nonvolatile memory device, and a random access memory (RAM), which is a volatile memory device. The ROM stores, for example, an invariant program (for example, basic input/output system (BIOS)). The RAM is a dynamic random access memory (DRAM) or other such high-speed volatile memory device, and temporarily stores a program to be executed by the processor 110 and data to be used at a time of execution of the program.

The auxiliary storage apparatus 130 is, for example, a large-capacity and non-volatile storage device such as a magnetic storage device (hard disk drive (HDD)) and a flash memory (solid state drive (SSD)). Programs to be executed by the processor 110 and data to be used at a time of execution of the program are stored in the auxiliary storage apparatus 130. Specifically, the programs are read out from the auxiliary storage apparatus 130, loaded onto the memory 120, and executed by the processor 110.

The input apparatus 140 is a keyboard, a mouse, or a similar apparatus through which input from an operator is received. The output apparatus 150 is a display apparatus, a printer, or a similar apparatus from which a result of executing a program is output in a format visually recognizable to the operator. The communication IF 160 is a network interface apparatus for controlling communication to and from another apparatus in accordance with a predetermined protocol.

The programs to be executed by the processor 110 are provided to the model creation apparatus 100 through intermediation of a removable medium (for example, CD-ROM or flash memory) or through the network, and is stored in the nonvolatile auxiliary memory apparatus 130 being a non-transitory storage medium. Therefore, the model creation apparatus 100 preferably includes an interface which reads data from the removable medium.

The model creation apparatus 100 is a computer system formed on physically one computer or formed on a plurality of computers that are configured logically or physically, and may be operated on separate threads on the same computer, or may operate on a virtual machine built on a plurality of physical computer resources. For example, instead of running on a single computer, the model creation apparatus 100 may be divided into a teaching object registration apparatus, which is a computer for registering a teaching object for recognizing an object and a recognition method, and a determination apparatus, which is a computer for determining whether an object is the teaching object with the use of the set recognition method.

The processor 110 includes, for example, the image acquisition module 111, the recognition module 112, the recognition result comparison module 113, the model correction module 114, and the output module 115, which are the function modules described above.

For example, the processor 110 functions as the image acquisition module 111 by operating in accordance with an image acquisition program loaded onto the memory 120, and functions as the recognition module 112 by operating in accordance with a recognition program loaded onto the memory 120. The same relationship between a program and a function module applies also to other function modules included in the processor 110.

A part or all of the functions of the functional modules included in the processor 110 may be implemented by hardware such as an application specific integrated circuit (ASIC) and a field-programmable gate array (FPGA).

The auxiliary storage apparatus 130 holds, for example, the image data 131 and the model data 132 described above. Part or all of information stored in the auxiliary storage apparatus 130 may be stored in the memory 120, or may be stored in an outside database coupled to the model creation apparatus 100, or the like.

In the first embodiment, information used by the model creation apparatus 100 is independent of data structure and may be expressed in any data structure. Although the information is expressed in a table format in the first embodiment, a data structure appropriately selected from among, for example, a list, a database, and a queue may store the information.

Figure 3:
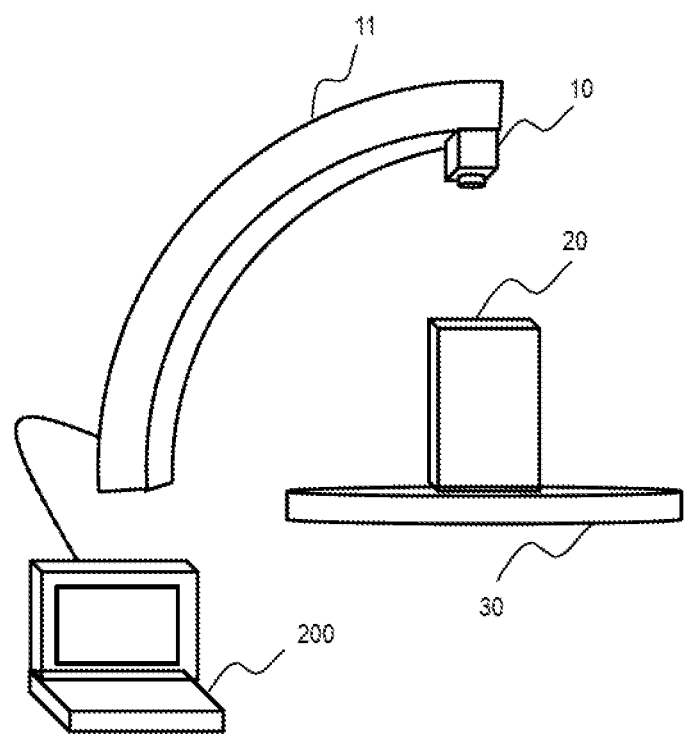
FIG. 3 is an example of an image pickup system for picking up an image of a registration target object to be provided to the model creation apparatus according to the first embodiment.

FIG. 3 is an example of an image pickup system for picking up an image of a registration target object 20 to be provided to the model creation apparatus 100. The image pickup system includes, for example, a camera 10, a turntable 30, and a terminal 200. The camera 10 picks up an image of the registration target object 20. An arm 11, for example, is attached to the camera 10, and movement of the arm 11 enables the camera 10 to pick up images from various positions and angles. A posture of an object means an angle of the object viewed from the camera 10, and is determined by a relative positional relationship between the object and the camera.

The registration target object 20 is mounted on the turntable 30. Turning of the turntable 30 and movement of the arm 11 enable the camera 10 to pick up images of the registration target object 20 in various postures. The terminal 200 is a computer coupled to the camera 10. The terminal 200 controls image pickup of the camera 10 and movement of the arm 11. The terminal 200 also acquires an image of the registration target object 20 picked up by the camera 10. The terminal 200 controls movement of the turntable 30 as well, to thereby enable the camera 10 to pick up images of the registration target object 20 in a plurality of postures.

Although not shown in FIG. 3, the terminal 200 is coupled to the model creation apparatus 100 to transmit an acquired image of the registration target object 20 to the model creation apparatus 100, and the image acquisition module 111 of the model creation apparatus 100 stores the received image in the image data 131. The terminal 200 may control the camera 10, the arm 11, and the turntable 30 by following instructions from the image acquisition module 111 of the model creation apparatus 100.

The model creation apparatus 100 and the terminal 200 may be integrated into one. The camera 10 may be built into the model creation apparatus 100 and, in this case, image pickup is executed on instruction from the image acquisition module 111.

In an example different from the example of FIG. 3, a plurality of cameras 10 installed on a surface of a sphere (or a hemisphere or the like) centered about the registration target object 20 may pick up images of the registration target object 20 in a plurality of postures. In another example, a single camera 10 fixed to a robot hand or the like instead of the arm 11 may pick up images of the registration target object 20 in a plurality of postures with movement of the robot hand or the like.

Figure 4:
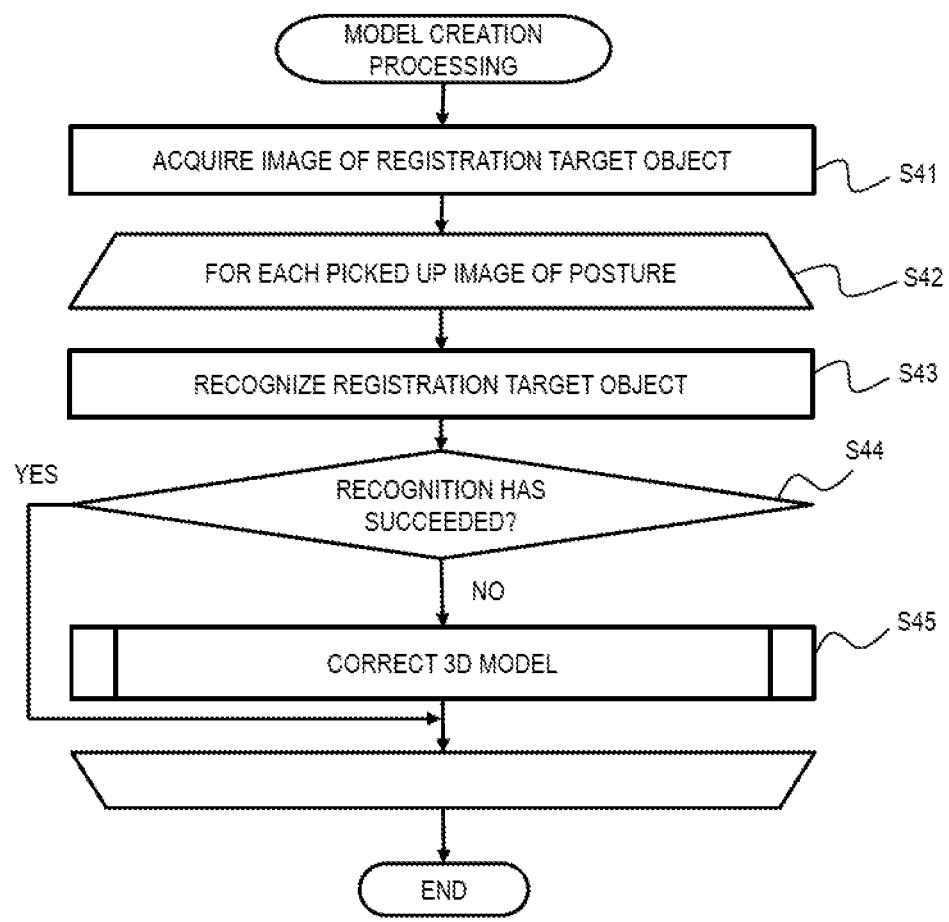
FIG. 4 is a flow chart for illustrating an example of model creation processing in which a 3D model of the registration target object is created according to the first embodiment.

FIG. 4 is a flow chart for illustrating an example of the model creation processing in which a 3D model of the registration target object 20 is created. The image acquisition module 111 acquires at least one image of the registration target object 20 in one or more postures, and information of each posture (Step S41). The model creation apparatus 100 executes processing steps of from Step S43 to Step S45 for the image of each posture (Step S42).

The recognition module 112 acquires a feature extractor for recognizing a posture of a reference object from the model data 132, inputs an image of the registration target object in this posture to the acquired feature extractor to have the feature extractor output a posture, and thus recognizes the posture (Step S43). In Step S43, a feature extractor selected by a user may be used, or a feature extractor associated with a reference object that has the closest feature to a feature of the registration target object (for example, a reference object smallest in squared distance between feature amounts) may be used. However, the same feature extractor is used in each execution of Step S43, which is executed a plurality of times. When the model data 132 includes a feature extractor shared by all reference objects as a feature extractor adaptable to any of the reference objects, this feature extractor may be used in Step S43. The recognition result comparison module 113 determines whether the posture of the registration target object and the posture recognized in Step S43 are the same (whether recognition has succeeded or failed) (Step S44).

When the recognition result comparison module 113 determines that the posture of the registration target object and the posture recognized in Step S43 are the same, (Step S44: YES), the process returns to Step S42 and the processing steps of from Step S43 to Step S45 are executed for the next posture. When execution of the processing steps is finished for every posture, the model creation processing is ended.

When the recognition result comparison module 113 determines that the posture of the registration target object and the posture recognized in Step S43 are not the same (Step S44: NO), the model correction module 114 acquires a 3D model of one reference object from the model data 132, and corrects the acquired 3D model, to thereby create a 3D model of the registration target object (Step S45). Details of Step S45 are described later.

Figure 5:
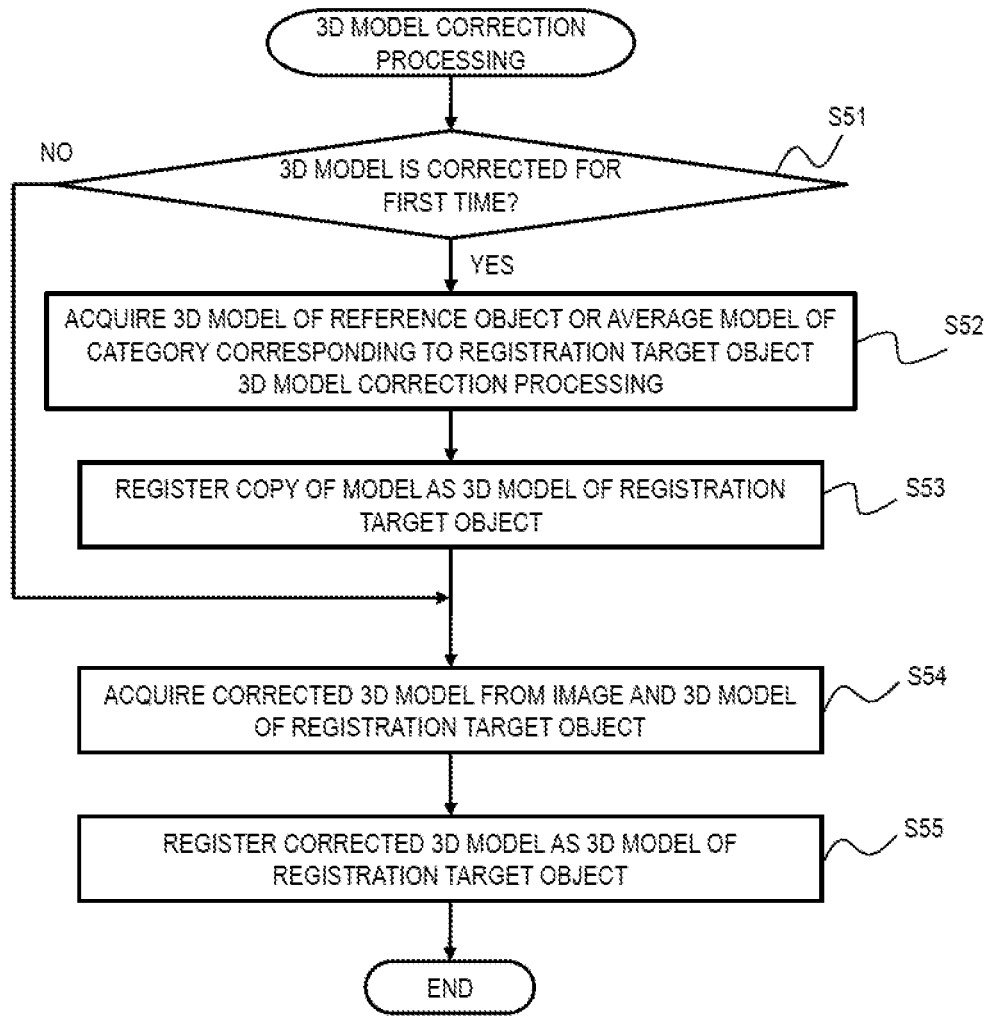
FIG. 5 is a flow chart for illustrating an example of 3D model correction processing according to the first embodiment.

FIG. 5 is a flow chart for illustrating an example of 3D model correction processing in Step S45. The model correction module 114 determines whether 3D model correction processing for creating a 3D model of the current registration target object is 3D model correction processing executed for the first time for the current registration target object (that is, whether Step S45 is executed for the first time for the current registration target object) (Step S51). When the model correction module 114 determines that this 3D model correction processing is 3D model correction processing executed for the second or more time for the current registration target object (Step S51: NO), the process proceeds to Step S54 described later.

When it is determined that this 3D model correction processing is 3D model correction processing executed for the first time for the current registration target object (Step S51: YES), the model correction module 114 acquires a 3D model from the model data 132. To give a specific example, the model correction module 114 acquires, for example, a 3D model of a reference object selected by the user of the model creation apparatus 100, from the model data 132. When a category to which reference objects belong is given, for example, the model correction module 114 may acquire 3D models of all reference objects belonging to this category from the model data 132, and use an average model of the acquired models as a 3D model to be acquired in Step S52.

The model correction module 114 registers a copy of the 3D model acquired in Step S52 in the model data 132 as a 3D model of the registration target object (Step S53). The model correction module 114 corrects the 3D model of the registration target object based on the image of the registration target object in the current posture (Step S54). Details of a method of correcting the 3D model are described later.

The model correction module 114 registers the corrected 3D model as a 3D model of the registration target object in the model data 132 by overwriting (Step S55), and ends the 3D model correction processing.

Figure 6A:
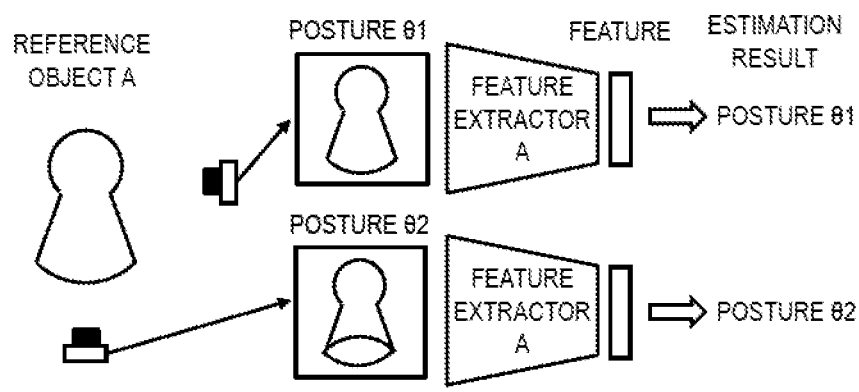
FIGS. 6A and 6B are explanatory diagrams for illustrating specific examples of processing of determining whether a 3D model requires to be corrected according to the first embodiment.
Figure 6B:
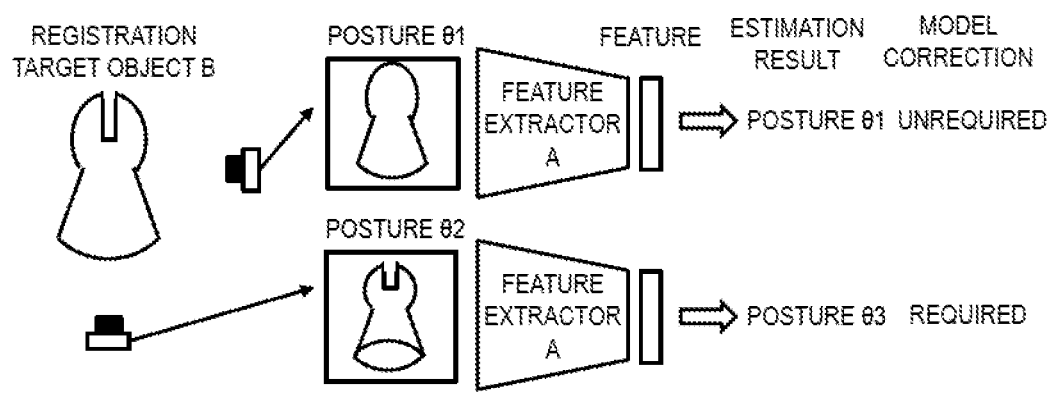

FIG. 6 is an explanatory diagram for illustrating specific examples of processing of determining whether a 3D model requires to be corrected. In an example of part (a), when an image of Reference Object A in a posture $\theta1$ is input to Feature Extractor A created by learning images of Reference Object A, the posture $\theta1$ is output. When an image of Reference Object A in a posture $\theta2$ is input to Feature Extractor A, the posture $\theta2$ is output.

In an example of part (b), when an image of Registration Target Object B in the posture $\theta1$ is input to Feature Extractor A, the posture $\theta1$ is output but, when an image of Registration Target Object B in the posture $\theta2$ is input to Feature Extractor A, a posture $\theta3$ is output. In other words, the 3D model correction processing in Step S45 is unrequired for the posture $\theta1$ of Registration Target Object B, but is required for the posture $\theta2$ of Registration Target Object B because the posture $\theta3$ different from the posture $\theta2$ is output.

Figure 7:
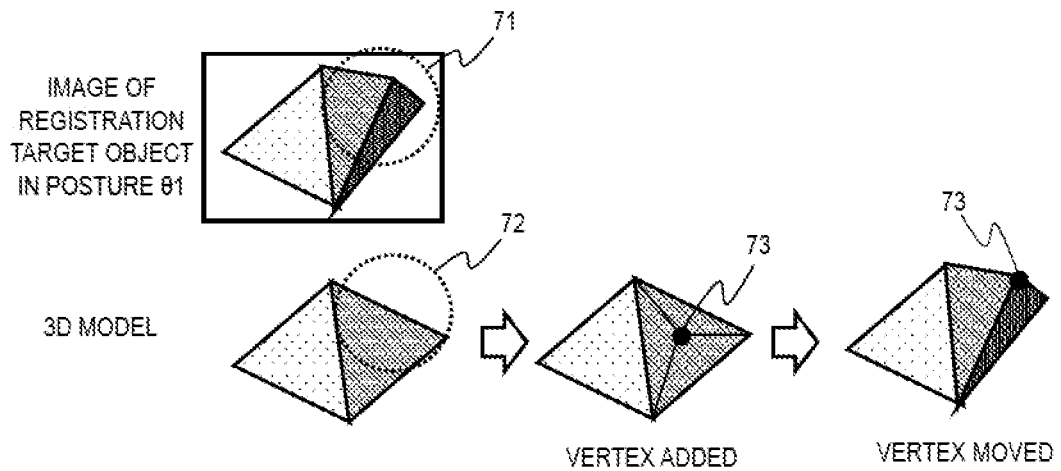
FIG. 7 is an explanatory diagram for illustrating a detailed example of the 3D model correction processing according to the first embodiment.

FIG. 7 is an explanatory diagram for illustrating a detailed example of the 3D model correction processing in Step S35. The following description is about an example in which an image of the registration target object is an RGB image. In the example of FIG. 7, the model correction module 114 has determined that a local area 71 of an image of the registration target object in the posture $\theta1$ and a local area 72 of the 3D model which corresponds to the local area 71 are dissimilar to each other (for example, that the degree of similarity in feature amount between the local area 71 and the local area 72 is equal to or less than a predetermined value (for example, a distance is equal to or more than a predetermined value)).

A comparison between the local area 71 and the local area 72 clarifies a difference in that, although the local area 71 includes two planes, the local area 72 includes one plane. The model correction module 114 accordingly adds a vertex 73 to the local area 72 of the 3D model, to thereby increase planes in number. The model correction module 114 moves the added vertex 73 so that the local area 72 resembles or matches the local area 71.

In the example of FIG. 7, the model correction module 114 thus corrects a differing area in the 3D model into a similar or matching area by refining a mesh of the differing area. The model correction module 114 may erase a vertex of the local area 72 and then move another vertex, or may simply move one of vertices of the local area 72, depending on how the local area 72 differs from the local area 71.

In this manner, to refine the mesh of the 3D model, the model correction module 114 can generate a mesh by, for example, automatically changing the number of vertices, or topology, of the mesh with the use of a neural network.

When, for example, the 3D model acquired in Step S52 is the exact 3D model of any one of reference objects, the image acquisition module 111 may acquire a more detailed picked up image (for example, an image higher in resolution or an enlarged image) of the vicinity of the local area 72 of this reference object, and the model correction module 114 may execute the mesh refining described above after additionally using this acquired image to correct the 3D model in Step S55.

The model correction module 114 may refine, in the manner described above, a mesh of an average model acquired in Step S52 by averaging 3D models of reference objects belonging to the same category, thereby being capable of correcting the average model. The model correction module 114 may also acquire images of reference objects belonging to the same category from the image data 131 in Step S52 to build a 3D model from an average image that is an average of the acquired images and use this 3D model as an average model.

When the 3D model acquired in Step S52 is the exact 3D model of any one of reference objects, the model correction module 114 may create a 3D model of the registration target object by building a 3D model anew with the use of a group of images in which, out of images of this reference objects in respective postures, an image of a posture that has failed in recognition in Step S44 is replaced with an image of the registration target object.

When an image of the registration target object is an RGB-depth image, the model correction module 114 creates a mesh from a group of image pickup points acquired from this image, and integrates the thus acquired mesh with the 3D model acquired in Step S52, to thereby correct this 3D model. When images of reference objects are also RGB-depth images, the model correction module 114 may correct this 3D model by acquiring the group of image pickup points from an image of a reference object corresponding to this 3D model in a corresponding posture, and replacing the group of image pickup points with the group of image pickup points acquired from the image of the registration target object.

In the first embodiment and embodiments described later, when 2D models of reference objects are stored in the model data 132, the model creation apparatus 100 may create a 2D model of the registration target object by correcting the 2D models of the reference objects.

For example, when a 2D model acquired in Step S52 and copied in Step S53 is a 2D model configured from an image of a reference object or images of reference objects, the model correction module 114 replaces an image of this 2D model in the current posture (viewpoint) with an image of the registration target object in the current posture, to thereby correct this 2D model. When the acquired and copied 2D model is a 2D model configured from a single image of a reference object, this 2D model is corrected by replacing the single image of the reference object with an image of the registration target object.

In another example in which a 2D model acquired in Step S52 and copied in Step S53 is a 2D model created from an edge or other local features in an image of a reference object by scale-invariant feature transform (SIFT), the model correction module 114 acquires this local feature from an image of this 2D model in the current posture (viewpoint), and replaces a local feature of the 2D model with the acquired local feature, to thereby correct the 2D model. When the acquired and copied 2D model is a 2D model configured from a single image of a reference object, this 2D model is corrected by replacing a local feature of the single image of the reference object with a local feature of the registration target object.

When noise is included in an image of the registration target object, the model correction module 114 corrects the 2D model by, for example, estimating a silhouette of the registration target object from this image and using one of the methods described above.

Through the processing described above, the model creation apparatus 100 according to the first embodiment creates a 3D model of a registration target object by correcting a 3D model of a reference object only in a part that affects recognition performance of a feature extractor. The model creation apparatus 100 can accordingly create a 3D model on which local information of the registration target object that affects the recognition performance is reflected, with a small volume of data and processing.

Second Embodiment

Figure 8:
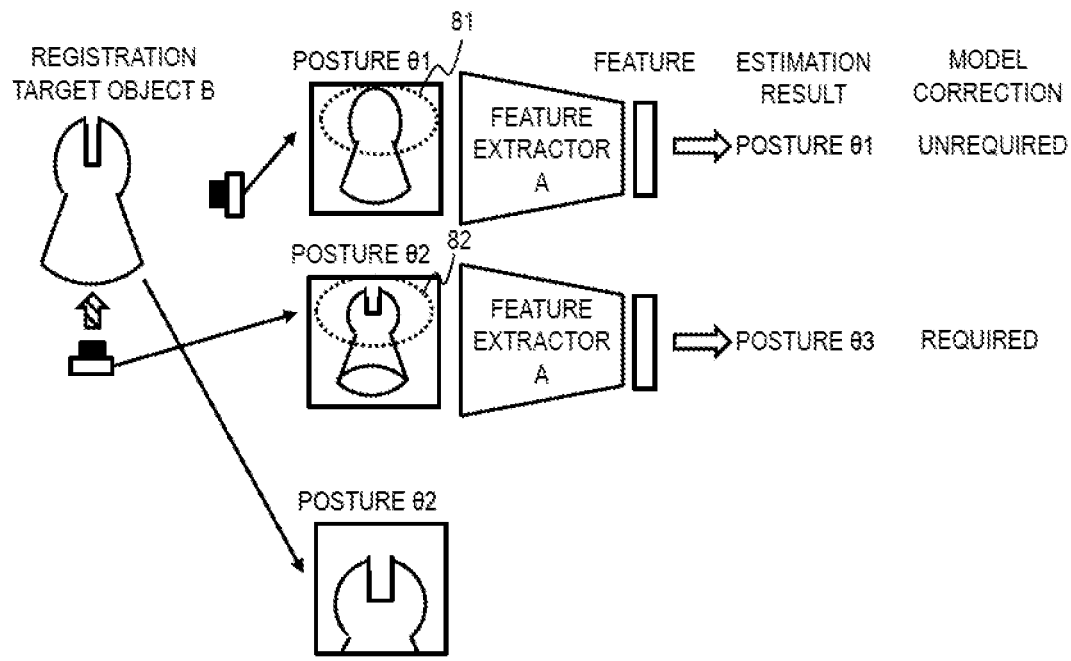
FIG. 8 is an explanatory diagram for illustrating a specific example of the processing of determining whether a 3D model requires to be corrected according to the second embodiment.

In a second embodiment of this invention, another example of details of the model correction processing is described. In the following embodiments, differences from the first embodiment are described and description that is a duplicate of description found in the first embodiment is omitted. FIG. 8 is an explanatory diagram for illustrating a specific example of the processing of determining whether a 3D model requires to be corrected.

As in the example of part (b) of FIG. 6, when an image of Registration Target Object B in the posture $\theta 1$ is input to Feature Extractor A, the posture $\theta 1$ is output but, when an image of Registration Target Object B in the posture $\theta 2$ is input to Feature Extractor A, the posture $\theta 3$ is output. In other words, the 3D model correction processing in Step S45 is unrequired for the posture $\theta 1$ of Registration Target Object B, but is required for the posture $\theta 2$ of Registration Target Object B because the posture $\theta 3$ different from the posture $\theta 2$ is output.

A premise here is that a local area of a reference object acquired by the recognition module 112 with the use of the feature extractor and a local area 82 of the registration target object which corresponds to the acquired local area have been determined to be dissimilar to each other (for example, the degree of similarity in feature amount is equal to or less than a predetermined value).

In this case, the model correction module 114 instructs the image acquisition module 111 to acquire a more detailed picked up image (for example, an image higher in resolution or an enlarged image) of the vicinity of the local area 82 of the registration target object in the posture for which it has been determined that model correction is required. For example, the image acquisition module 111 instructs the terminal 200 to pick up this image, and acquires this image from the terminal 200. The model correction module 114 uses information of the acquired image to execute the model correction in Step S54.

In processing of FIG. 8, the model correction module 114 corrects the 3D model based on an image of the vicinity of a local area of the registration target object that is dissimilar to a reference object (a differing area). A 3D model on which details of the differing area of the registration target object are reflected can accordingly be created.

Figure 9:
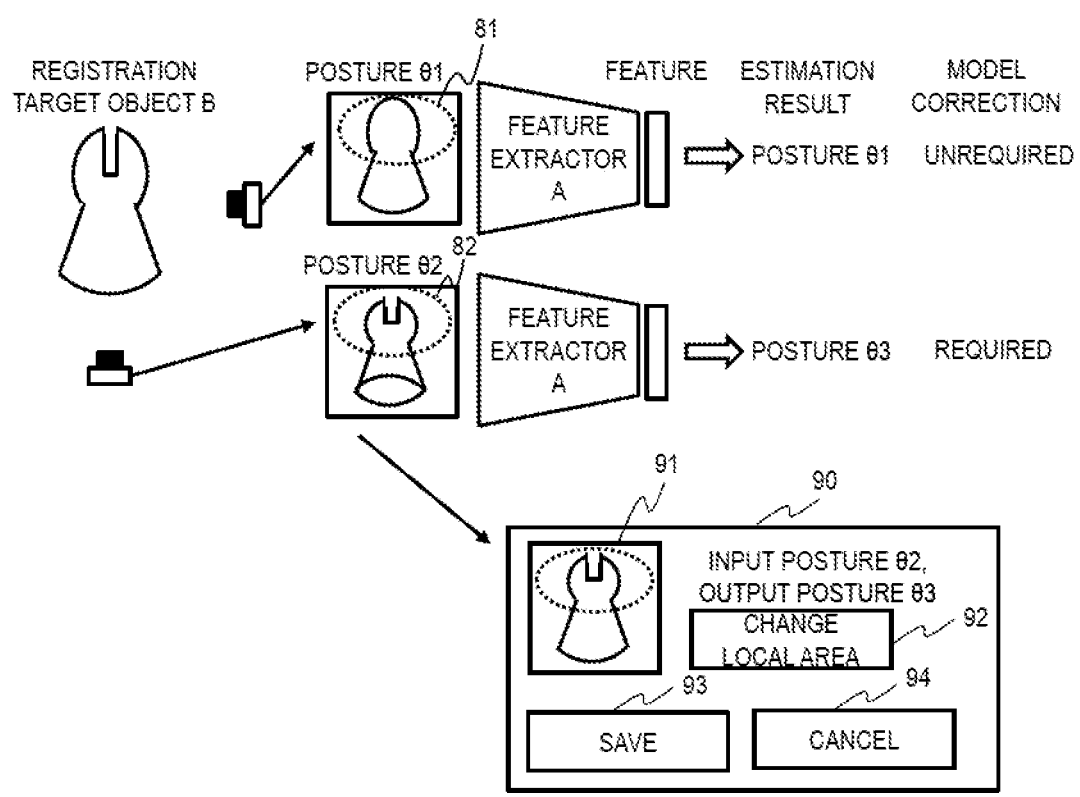
FIG. 9 is an explanatory diagram for illustrating specific examples of processing of determining whether a 3D model requires to be corrected according to the second embodiment.

FIG. 9 is an explanatory diagram for illustrating specific examples of processing of determining whether a 3D model requires to be corrected. As in the example of FIG. 8, when an image of Registration Target Object B in the posture $\theta 1$ is input to Feature Extractor A, the posture $\theta 1$ is output but, when an image of Registration Target Object B in the posture $\theta 2$ is input to Feature Extractor A, the posture $\theta 3$ is output. In other words, the 3D model correction processing in Step S45 is unrequired for the posture $\theta 1$ of Registration Target Object B, but is required for the posture $\theta 2$ of Registration Target Object B because the posture $\theta 3$ different from the posture $\theta 2$ is output.

A premise here is that the local area of a reference object acquired by the recognition module 112 with the use of the feature extractor and the local area 82 of the registration target object which corresponds to the acquired local area have been determined to be dissimilar to each other (for example, the degree of similarity in feature amount is equal to or less than the predetermined value).

In this case, the output module 115 outputs a local area specification screen 90 to the output apparatus 150. The local area specification screen 90 includes, for example, an object image display area 91, a "change local area" button 92, a save button 93, and a cancel button 94.

The local area specification screen 90 displays the image of the registration target object in the posture $\theta 2$ (namely, an input image that has been input when a wrong posture is output) and display indicating the local area (dashed-line ellipse of FIG. 9). In order for the user to easily grasp a dissimilar area, the local area specification screen 90 may display an image of the reference object in the posture θ2 (namely, an image of the reference object in the correct posture that is supposed to be output) in place of, or in addition to, the image of the registration target object in the posture θ2, in response to, for example, instruction from the user.

The "change local area" button 92 is a button for changing a range of the local area. For example, selection of the "change local area" button 92 causes a shift to a state in which the display indicating the local area in the local area specification screen 90 is changeable by input from the user. The save button 93 is a button for saving a changed local area. When the save button 93 is selected, the model correction module 114 uses information of an image of the changed local area to execute the model correction in Step S54.

The cancel button 94 is a button for ending the process without changing the local area. When the cancel button is selected, the model correction module 114 uses information of the image of the local area before the canceled change to execute the model correction in Step S54.

The model correction module 114 instructs the image acquisition module 111 to acquire a more detailed picked up image (for example, an image higher in resolution or an enlarged image) of the vicinity of the local area, which is determined through the local area specification screen 90, of the registration target object in the posture for which it has been determined that model correction is required. For example, the image acquisition module 111 instructs the terminal 200 to pick up this image, and acquires this image from the terminal 200. The model correction module 114 uses information of the acquired image to execute the model correction in Step S54.

In processing of FIG. 9, the model correction module 114 corrects the 3D model based on an image of the vicinity of a local area (differing area) selected by the user. A 3D model on which details of a differing area of the registration target object, particularly an area difficult to be recognized by a feature extractor, are reflected can accordingly be created.

Third Embodiment

Figure 10:
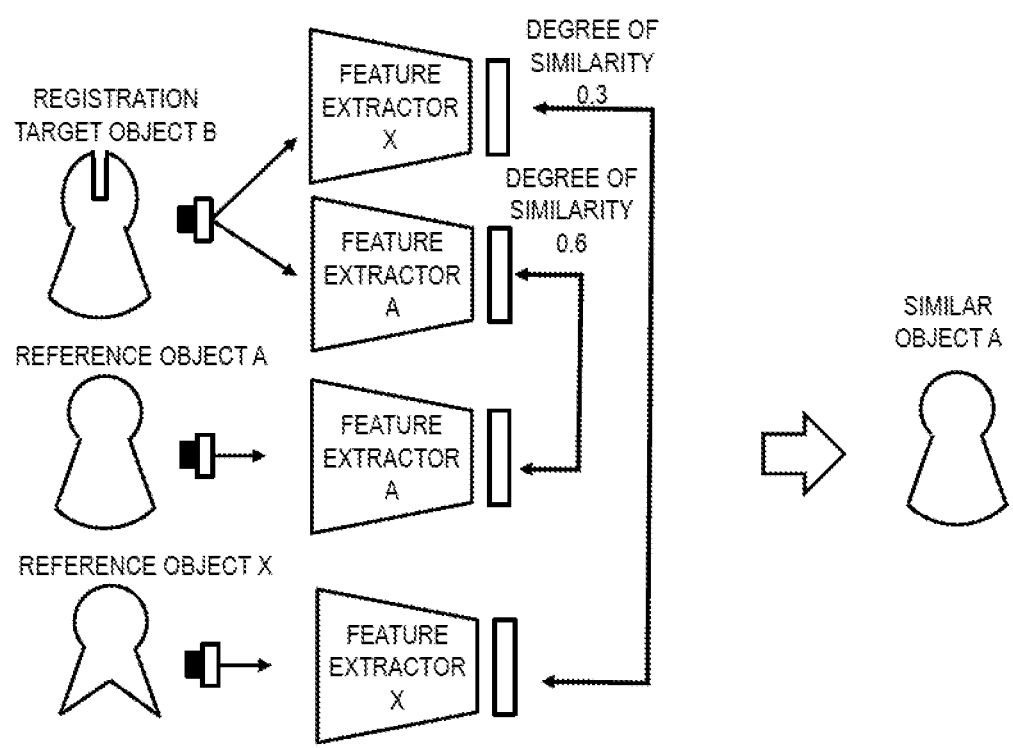
FIG. 10 is an explanatory diagram for illustrating an example of 3D model selection processing according to the third embodiment.

In a third embodiment of this invention, another example of the processing of selecting a 3D model in Step S52 is described. FIG. 10 is an explanatory diagram for illustrating an example of 3D model selection processing in Step S52. The model correction module 114 acquires images of the registration target object and a plurality of reference objects (for example, a plurality of reference objects selected by the user or all reference objects) from the image data 131, and inputs the acquired images to feature extractors each associated with one of the plurality of reference objects.

The model correction module 114 may acquire images of the registration target object and a plurality of reference objects in one posture (a plurality of postures each of which is the same for the registration target object and for the plurality of reference objects) and input the acquired images to the feature extractors, or may acquire images of the registration target object and a plurality of reference objects in all postures and input the acquired images to the feature extractors.

The model correction module 114 calculates, for each of the plurality of reference objects, the degree of similarity to the registration target object, based on features extracted by the relevant one of the feature extractors. Examples of the degree of similarity calculated by the model correction module 114 include cosine similarity and a squared distance between feature amounts. The model correction module 114 determines one of the plurality of reference objects that is highest in calculated degree of similarity as a similar object, and acquires a 3D model of the similar object from the model data 132.

In the example of FIG. 10, the degree of similarity between Registration Target Object B and Reference Object A is 0.6, and the degree of similarity between Registration Target Object B and Reference Object X is 0.4. The model correction module 114 accordingly determines Reference Object A as a similar object, and acquires a 3D model of Reference Object A from the model data 132.

In the processing of FIG. 10, the model correction module 114 selects a 3D model of a reference object that has a high degree of similarity to the registration target object, and can accordingly select a 3D model appropriate as a correction target. Ultimately, the volume of processing required to correct this 3D model is likely to decrease.

Figure 11:
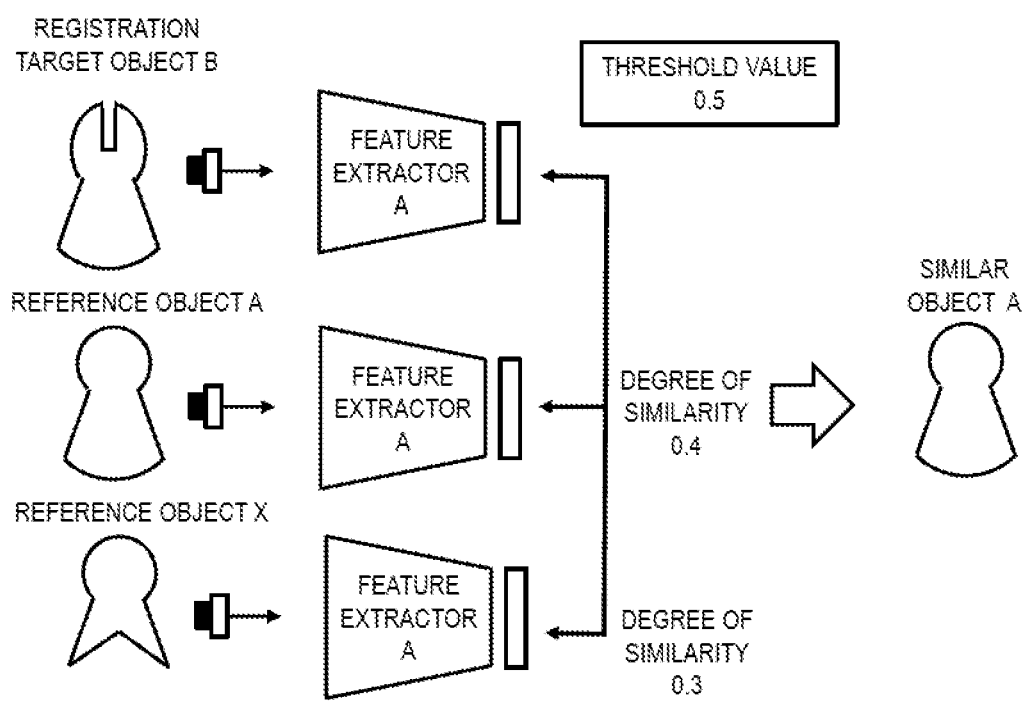
FIG. 11 is an explanatory diagram for illustrating an example of the 3D model selection processing according to the third embodiment.

FIG. 11 is an explanatory diagram for illustrating an example of the 3D model selection processing in Step S52. As in the example of FIG. 10, the model correction module 114 calculates, for each of a plurality of reference objects, the degree of similarity to the registration target object. When it is determined that every calculated degree of similarity is equal to or less than a predetermined threshold value, the model correction module 114 stops the model correction processing without selecting a model in Step S52, and newly creates a 3D model of the registration target object.

In the example of FIG. 11, the threshold value for the degree of similarity is 0.5, the degree of similarity between Registration Target Object B and Reference Object A is 0.4, which is lower than the threshold value, and the degree of similarity between Registration Target Object B and Reference Object X is 0.3, which is lower than the threshold value. The model correction module 114 consequently selects no 3D model of any reference object, and newly creates a 3D model of Registration Target Object B.

In the processing of FIG. 11, when no reference object has a high degree of similarity to the registration target object, the model correction module 114 newly creates a 3D model of the registration target object, and therefore does not select a 3D model inappropriate as a correction target. In addition, there is a case in which, when the model correction module 114 selects a 3D model of a reference object having a high degree of similarity to the registration target object and creates a 3D model of the registration target object by correcting the selected 3D model, the creation may lead to unintended and unwanted results including an increase in processing volume and insufficient recognition performance. The model correction module 114 can prevent this situation by executing the processing of FIG. 11.

Fourth Embodiment

Figure 12:
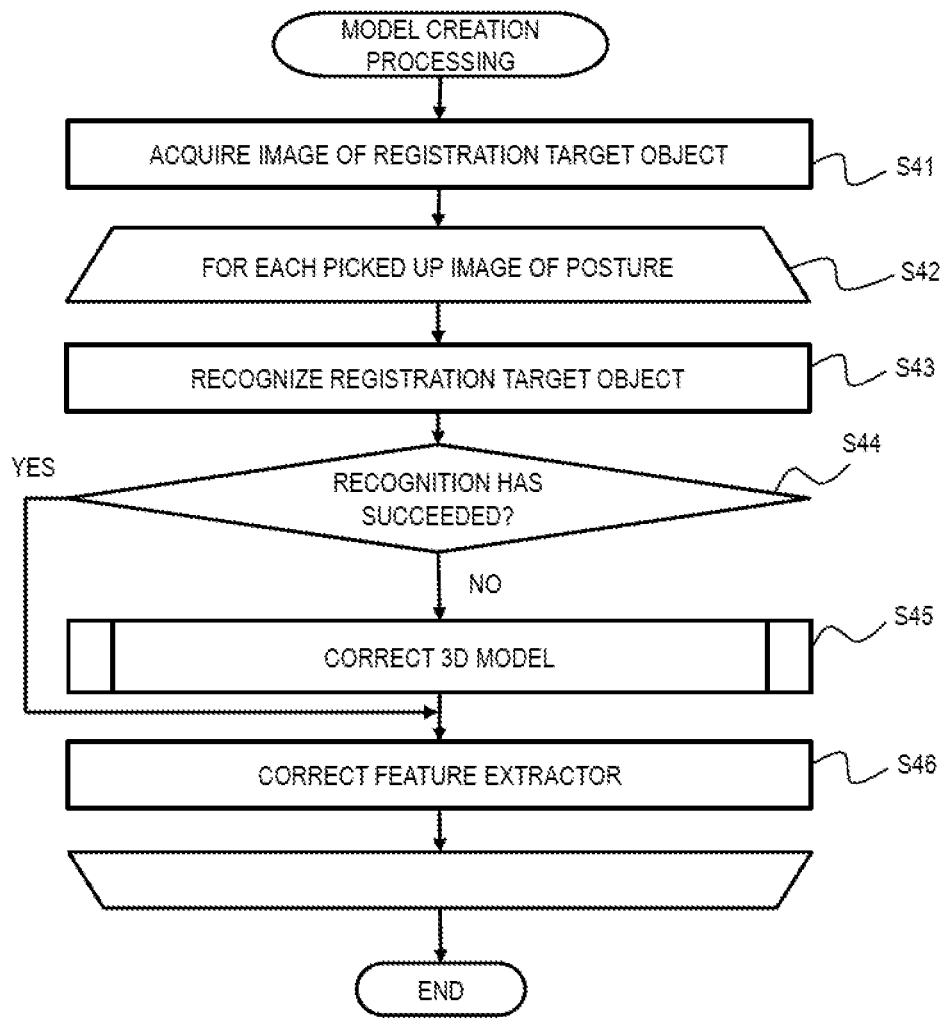
FIG. 12 is a flow chart for illustrating an example of the model creation processing according to the fourth embodiment.

In a fourth embodiment of this invention, another example of the model creation processing is described. The model creation apparatus 100 according to the fourth embodiment corrects a feature extractor, depending on a result of recognition of the registration target object. FIG. 12 is a flow chart for illustrating an example of the model creation processing in the fourth embodiment.

When the recognition result comparison module 113 determines that the posture of the registration target object and the posture recognized in Step S43 are the same (Step S44: YES), or after the model correction processing in Step S45 is finished, the recognition module 112 corrects a feature extractor based on an image of the registration target object (Step S46). The following is description on a specific example of feature extractor correction processing.

Figure 13:
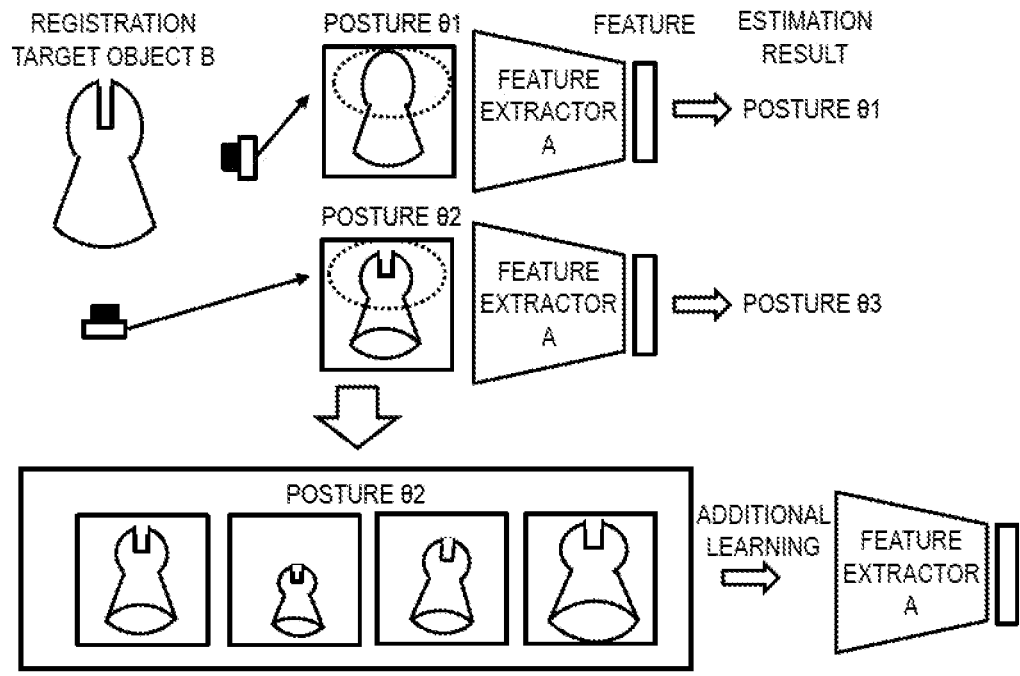
FIG. 13 is an explanatory diagram for illustrating an example of the feature extractor correction processing according to the fourth embodiment.

FIG. 13 is an explanatory diagram for illustrating an example of the feature extractor correction processing. As in the example of FIG. 8, when an image of Registration Target Object B in the posture $\theta1$ is input to Feature Extractor A, the posture $\theta1$ is output but, when an image of Registration Target Object B in the posture $\theta2$ is input to Feature Extractor A, the posture $\theta3$ is output.

In this case, the recognition module 112 acquires an image of the registration target object in the posture $\theta2$ (namely, an image of the registration target object in the correct posture that is supposed to be output from the feature extractor) from the image data 131, and associates the acquired image with the posture $\theta2$ for additional learning of Feature Extractor A, to thereby overwrite Feature Extractor A in the model data 132. The recognition module 112 thus enables the feature extractor of the registration target object to quickly learn an image of a posture that is low in recognition precision.

In the case in which a feature extractor and a posture estimator are separate members, the recognition module 112 overwrites the feature extractor in the model data 132 through the additional learning described above by the posture estimator and additional learning of the image of the registration target object in the posture $\theta2$ (namely, the image of the registration target object in the correct posture that is supposed to be output from the posture estimator) by the feature extractor.

Subsequently, in the next creation of a 3D model of a registration target object, the recognition module 112 uses the overwritten Feature Extractor A to execute processing of outputting a posture of the registration target object in Step S52. Posture estimation using Feature Extractor A on which the feature of the registration target object of the last time is reflected is thus executed, and the processing volume of the model creation processing for a registration target object that has a feature close to the feature of the last registration target object is accordingly reduced.

When the image data 131 does not include a sufficient number of images of the registration target object in the posture $\theta2$ (for example, when the image data 131 includes the images only in a number equal to or less than a predetermined number), the recognition module 112 instructs the image acquisition module 111 to acquire the predetermined number of images of the registration target object in the posture $\theta2$. For example, the image acquisition module 111 instructs the terminal 200 to pick up the predetermined number of images of the registration target object, and acquires the predetermined number of images of the registration target object from the terminal 200.

Figure 14:
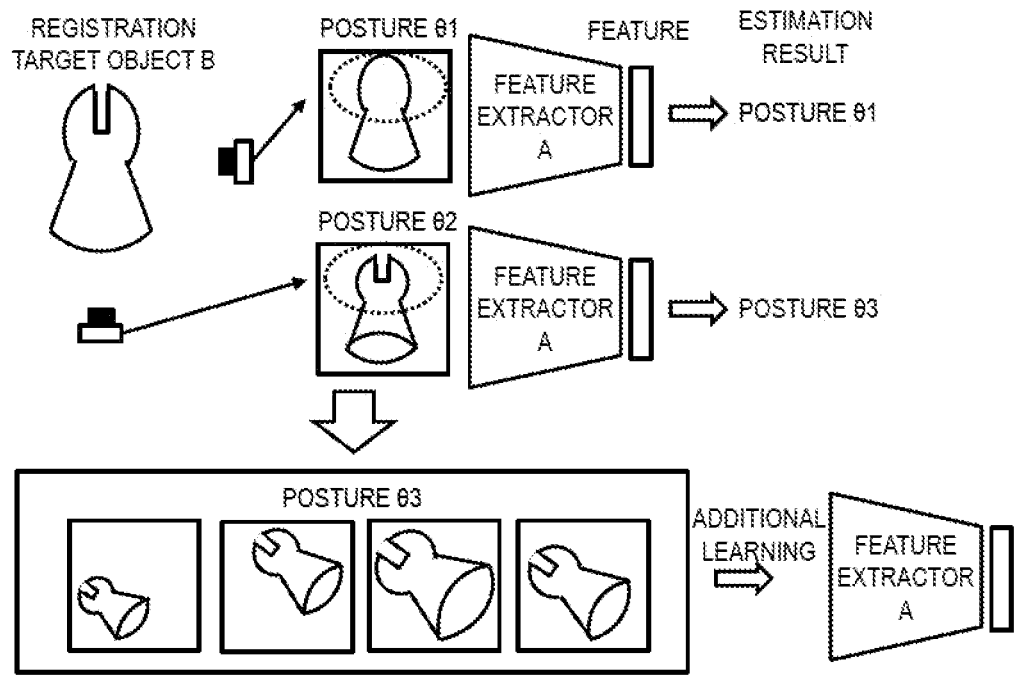
FIG. 14 is an explanatory diagram for illustrating an example of the feature extractor correction processing according to the fourth embodiment.

FIG. 14 is an explanatory diagram for illustrating an example of the feature extractor correction processing. As in the example of FIG. 8, when an image of Registration Target Object B in the posture $\theta1$ is input to Feature Extractor A, the posture $\theta1$ is output but, when an image of Registration Target Object B in the posture $\theta2$ is input to Feature Extractor A, the posture $\theta3$ is output.

In this case, the recognition module 112 acquires an image of the registration target object in the posture $\theta3$ (namely, an image of the registration target object in the wrong posture that is output from the feature extractor) from the image data 131, and associates the acquired image with the posture $\theta3$ for additional learning of Feature Extractor A, to thereby overwrite Feature Extractor A in the model data 132. The recognition module 112 thus enables the feature extractor of the registration target object to quickly learn an image of a posture that is low in recognition precision.

In the case in which a feature extractor and a posture estimator are separate members, the recognition module 112 overwrites the feature extractor in the model data 132 through the additional learning described above by the posture estimator and additional learning of the image of the registration target object in the posture $\theta3$ (namely, the image of the registration target object in the wrong posture that is output from the feature extractor) by the feature extractor.

Subsequently, in the next creation of a 3D model of a registration target object, the recognition module 112 uses the overwritten Feature Extractor A to execute processing of outputting a posture of the registration target object in Step S52. Posture estimation using Feature Extractor A on which the feature of the registration target object of the last time is reflected is thus executed, and the processing volume of the model creation processing for a registration target object that has a feature close to the feature of the last registration target object is accordingly reduced.

When the image data 131 does not include a sufficient number of images of the registration target object in the posture $\theta3$ (for example, when the image data 131 includes the images only in a number equal to or less than a predetermined number), the recognition module 112 instructs the image acquisition module 111 to acquire the predetermined number of images of the registration target object in the posture $\theta3$. For example, the image acquisition module 111 instructs the terminal 200 to pick up the predetermined number of images of the registration target object, and acquires the predetermined number of images of the registration target object from the terminal 200.

For example, the recognition module 112 may execute additional learning in which the feature extractor additionally learns both of the image of the registration target object in the posture $\theta2$ (namely, the image of the registration target object in the correct posture that is supposed to be output from the feature extractor) and images of the registration target object in the posture $\theta3$ (namely, images of the registration target object in the wrong posture output from the feature extractor).

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration. The above-described configurations, functions, and processors, for all or a part of them, may be implemented by hardware: for example, by designing an integrated circuit.

The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A model creation apparatus for creating a model that indicates a shape of a registration target object, the model creation apparatus comprising:
a processor; and
a memory,
the memory being configured to hold:
at least one image of the registration target object in one or more postures; and
a reference model indicating a shape of a reference object, the processor being configured to:
acquire information indicating a feature of the registration target object in a first posture; and
correct, when a shape in the first posture that is indicated by the reference model is determined to be dissimilar based on a predetermined first condition, the reference model based on the information indicating the feature to thereby create the model indicating the shape of the registration target object; and
wherein the memory is configured to hold a feature extractor which is created by learning images of the reference object, and which is configured to output a posture when an image is input to the feature extractor, and
wherein the processor is configured to correct, when a first image of the registration target object in the first posture is input to the feature extractor and a second posture different from the first posture is output from the feature extractor in response, the reference model based on the information indicating the feature to thereby create the model indicating the shape of the registration target object.

2. The model creation apparatus according to claim 1, wherein the memory is configured to hold:
a reference model indicating a shape of the reference object which is one of a plurality of reference objects, and reference models indicating shapes of remaining reference objects out of the plurality of reference objects; and
at least one image of each of the plurality of reference objects in the one or more postures, and
wherein the processor is configured to:
input, when the first image is input to the feature extractor and the second posture is output from the feature extractor in response, the first image of the registration target object and an image of each of the plurality of reference objects in the first posture to the feature extractor to thereby calculate a degree of similarity to the registration target object for each of the plurality of reference objects; and
correct the reference model of one of the plurality of reference objects that has the highest calculated degree of similarity, based on the information indicating the feature of the registration target object in the first posture, to thereby create the model indicating the shape of the registration target object.

3. The model creation apparatus according to claim 1, wherein the memory is configured to hold:
a reference model indicating a shape of the reference object which is one of a plurality of reference objects, and reference models indicating shapes of remaining reference objects out of the plurality of reference objects; and
at least one image of each of the plurality of reference objects in the one or more postures,
wherein the feature extractor is created by learning images of the plurality of reference objects,
wherein, when the first image is input to the feature extractor and the second posture is output from the feature extractor in response, the first image is compared to an image of each of the plurality of reference objects in the first posture, to calculate a degree of similarity to the registration target object for each of the plurality of reference objects, and
wherein, when the calculated degree of similarity is equal to or less than a predetermined threshold value for every one of the plurality of reference objects, a model indicating a shape of the registration target object is newly created without correcting any of the reference models.

4. The model creation apparatus according to claim 1, wherein the memory is configured to hold a second image different from the first image of the registration target object in the first posture, and
wherein the processor is configured to:
cause, when the first image is input to the feature extractor and the second posture is output from the feature extractor in response, the feature extractor to learn the second image; and
store the feature extractor that has finished the learning in the memory.

5. The model creation apparatus according to claim 4, wherein the feature extractor comprises an extraction module configured to extract a feature of an image, and a posture estimation module configured to output a posture based on the feature extracted by the extraction module, and
wherein, when the first image is input to the feature extractor and the second posture is output from the feature extractor in response, the second image is learned by the posture estimation module.

6. The model creation apparatus according to claim 1, wherein the memory is configured to hold a third image of the registration target object in the second posture, and
wherein the processor is configured to:
cause, when the first image is input to the feature extractor and the second posture is output from the feature extractor in response, the feature extractor to learn the third image; and
store the feature extractor that has finished the learning in the memory.

7. The model creation apparatus according to claim 6, wherein the feature extractor comprises an extraction module configured to extract a feature of an image, and a posture estimation module configured to output a posture based on the feature extracted by the extraction module, and
wherein, when the first image is input to the feature extractor and the second posture is output from the feature extractor in response, the third image is learned by the posture estimation module.

8. The model creation apparatus according to claim 1, wherein the memory is configured to hold information indicating a feature of a local area of an image of the reference object, and
wherein the processor is configured to:
identify, when the first image of the registration target object in the first posture is input to the feature extractor and the second posture is output from the feature extractor in response, a local area in the registration target object and a local area in the reference object in which information indicating a feature of the local area of the registration target object and information indicating a feature of the local area of the reference object are dissimilar to each other, based on a predetermined condition;

acquire a detailed image of the identified local area of the registration target object;

acquire information indicating a feature of the detailed image; and correct the feature of local area of the reference object indicated by the reference model so that a degree of similarity between the feature of the local area of the reference object and the feature indicated by the acquired information of the detailed image is increased.

9. The model creation apparatus according to claim 1, further comprising an input apparatus and a display apparatus, wherein the memory is configured to hold information indicating a feature of a local area of an image of the reference object and an image of the reference object in the first posture, and wherein the processor is configured to:

display, when the first image of the registration target object in the first posture is input to the feature extractor and the second posture is output from the feature extractor in response, an image of the registration target object in the first posture, the image of the reference object in the first posture, and display for designating the local area on the display apparatus;

identify the local area by receiving the specification of a local area based on the input to the input device via the display for designating the local area;

acquire information indicating a feature of the specified local area; and correct the feature of the specified local area of the reference object indicated by the reference model so that a degree of similarity between the feature of the local area in the reference object and the feature in the specified local area indicated by the acquired information is increased.

10. The model creation apparatus according to claim 1, wherein the reference model is a three-dimensional model in which a shape of the reference object is defined by a mesh and vertices, and wherein the processor is configured to;

identify, when the first image of the registration target object in the first posture is input to the feature extractor and the second posture is output from the feature extractor in response, a local area in the registration target object in the first posture indicated by the first image and a local area in the reference object indicated by the reference model in which information indicating a feature of the local area of the registration target object and information indicating a feature of the local area of the reference object are dissimilar to each other, based on a predetermined condition; and correct the reference model by increasing or decreasing the vertices in the reference model based on a shape in the local are of the registration target object in the first posture indicated by the first image, and by moving the increased or decreased vertices.

11. The model creation apparatus according to claim 1, wherein the memory is configured to hold:

at least one image of the reference object which is one of a plurality of reference objects in the one or more postures, and images of remaining reference objects out of the plurality of reference objects in the one or more postures; and category information indicating to which category the registration target object belongs and to which categories the plurality of reference objects belong, and wherein the processor is configured to:

identify, when the first image of the registration target object in the first posture is input to the feature extractor and the second posture is output from the feature extractor in response, a local area in the registration target object in the first posture indicated by the first image and a local area in the reference object indicated by the reference model in which information indicating a feature of the local area of the registration target object and information indicating a feature of the local area of the reference object are dissimilar to each other, based on a predetermined condition; and identify, by referring to the category information, reference objects out of the plurality of reference objects which belong to the same category as the category of the registration target object;

create an average model indicating a shape of an averaged image that is obtained by averaging images of the identified reference objects; and correct, the feature of the local area of the reference object indicated by the average model so that a degree of the similarity between the feature of the local area of the reference object indicated by the average model and the feature of the local area of the registration target object in the first posture indicated by the first image is increased.

12. A model creation method for creating a model that indicates a shape of a registration target object by a model creation apparatus, the model creation apparatus configured to hold:

at least one image of the registration target object in one or more postures; and a reference model indicating a shape of a reference object, the model creation method comprising:

acquiring, by the model creation apparatus, information indicating a feature of the registration target object in a first posture; and correcting, by the model creation apparatus, when a shape in the first posture that is indicated by the reference model is determined to be dissimilar based on a predetermined first condition, the reference model based on the information indicating the feature to thereby create the model indicating the shape of the registration target object; and wherein the memory is configured to hold a feature extractor which is created by learning images of the reference object, and which is configured to output a posture when an image is input to the feature extractor, and wherein the processor is configured to correct, when a first image of the registration target object in the first posture is input to the feature extractor and a second posture different from the first posture is output from the feature extractor in response, the reference model based on the information indicating the feature to thereby create the model indicating the shape of the registration target object.

13. The model creation apparatus according to claim 1, wherein the processor is configured to:

identify, when the first image of the registration target object in the first posture is input to the feature extractor and the second posture is output from the feature extractor in response, a local area in the registration target object in the first posture indicated by the first image and a local area in the reference object indicated by the reference model in which information indicating a feature of the local area of the registration target object and information indicating a feature of the local area of the reference object are dissimilar to each other, based on a predetermined condition; and correct the feature of the local area in the reference object indicated by the reference model to be more similar to the feature of the local area in the registration target object in the first posture indicated by the first image.

* * * * *